United States Patent Office 2,876,221
Patented Mar. 3, 1959

2,876,221

NOVEL 2,4 BIS (ALKYL AND HALOALKYL SUBSTITUTED)-6-HYDROXY 1,3,5 TRIAZINE AMIDINE SALTS

Hansjuergen Schroeder and Christoph J. Grundmann, Columbus, Ohio, assignors to Olin Mathieson Chemical Corporation, a corporation of Virginia No Drawing. Application August 22, 1955
Serial No. 529,927

20 Claims. (Cl. 260—248)

Our invention relates to novel 2,4-bis(alkyl and haloalkyl substituted)-6-hydroxy-1,3,5-triazine amidine salts of the general formula:

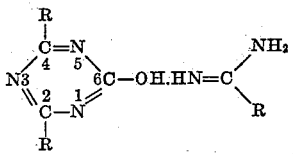

wherein R is an alkyl or haloalkyl radical. Preferred alkyl radicals are the lower alkyl radicals having from 1 to 4 carbon atoms, i. e. methyl, ethyl, propyl and butyl, although alkyl radicals containing up to 12 carbon atoms are included in the scope of this invention. The halogen derivatives of the alkyl radicals include fluorine, bromine, chlorine and iodine. The haloalkyl radicals include, for example, monochloromethyl, dichloromethyl, trichloromethyl and $CH_3(CH_2)_n CHCl—$ (where $n=0$ to 12) and the corresponding fluorine, bromine and iodine derivatives. Our compounds are useful as intermediates.

The synthesis of the haloalkyl substituted compounds is accomplished according to the following equation:

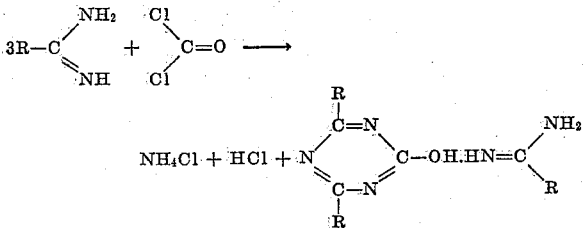

wherein R in the amidine is a haloalkyl group having the halogen on the carbon adjacent to the amidine group.

The phosgenation of aromatic amidines has been known for some time as a method of preparation of aromatic hydroxy-1,3,5-triazines. It is reported not to be applicable to the formation of aliphatic hydroxy triazines. We have found this to be generally true. We have now found that haloalkyl amidine hydrohalide salts, which are substituted by one or more halogen atoms in the carbon atom adjacent to the amidine group, react readily with phosgene to form the desired haloalkyl monohydroxy triazine amidine salts. The free haloalkyl amidines can also be used, but these are generally unstable. The stability of the hydrohalide salts of these bases makes their use preferable, and they are then converted, in the reaction mixture, to the free base by the addition of a suitable strong alkali such as alkaline earth or alkali metal hydroxides, e. g. sodium hydroxide. Preferably, the phosgene is added in an inert organic solvent, e. g. toluene. Examples of some suitable amidines are those in which R is $CH_2Cl—$, $CHCl_2—$, $CCl_3—$ and $CH_3(CH_2)_n CHCl—$ (where $n=0$ to 12) and the corresponding bromine, fluorine and iodine derivatives.

The haloalkyl monohydroxy triazine amidine salts resulting from the above synthesis are then easily reduced at atmospheric pressure and room temperature, to the corresponding unhalogenated alkyl monohydroxy triazine amidine salts in the presence of one of the common hydrogenation catalysts including Raney nickel and platinum or palladium on carbon. Elevated pressures and temperatures can be used if desired. The ease of this catalytic hydrogenolysis is surprising since other halogen compounds of the triazine series, particularly those bearing halogen directly on the triazine ring, act as hydrogenation catalyst poisons.

The alkyl hydroxy triazine amidine salts of our invention are useful to prepare 2,4-bis(alkyl substituted)-6-hydroxy-1,3,5-triazines of the formula

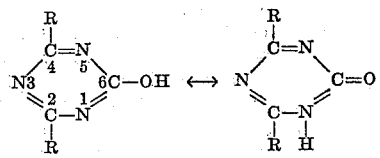

wherein R is an alkyl radical, by treating the amidine salts with hydrogen halide, e. g. hydrogen chloride, to form an amidine hydrohalide and to precipitate the hydroxy triazine hydrohalide hydrate which is then converted to the hydroxy triazine by treatment with an alkali such as alkaline earth or alkali metal hydroxides, e. g. sodium hydroxide, as more fully described and claimed in our copending application Serial No. 532,120, filed September 1, 1955, now U. S. Patent 2,832,778.

The hydroxy triazine amidine salts of our invention are also useful in preparing 2,4-bis-(alkyl or haloalkyl)-6-halo-1,3,5-triazines of the formula

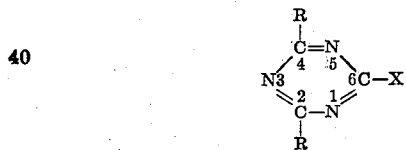

wherein R is an alkyl or haloalkyl radical and X is a halogen, by reaction with a phosphorus oxyhalide as more fully described and claimed in our pending application Serial No. 529,928, filed August 22, 1955. The halo-triazines are useful as fungicides and intermediates.

The novel compounds of our invention and their preparation will be further illustrated by reference to the following examples:

Example I (A) 54 grams of trichloroacetamidine was added with stirring to 400 milliliters of water at 25° C. The amidine dissolved completely upon the addition of approximately one-fourth of a solution of 20 grams of NaOH in 50 milliliters of $H_2O$. The solution was cooled to and maintained at 5–10° C. throughout the course of the reaction. A solution of 25 grams of $COCl_2$ in 120 milliliters of toluene was added dropwise with efficient stirring until the pH reached a value of 6. By alternate addition of phosgene and more of the above mentioned NaOH solution, the pH was maintained at 8–10. Finally the pH was brought to 6, the precipitated 2,4-bis-(trichloromethyl)-6-hydroxy-1,3,5-triazine-trichloroacetamidine salt was filtered by suction and dried in vacuum over $P_2O_5$. The yield was 41 grams of 74 percent of theory of the salt having a melting point of 218–224° C.

Purification for analysis was accomplished by dissolving the product in ethanol and precipitating it with cold water. It then had a melting point of 222–224° C.

|  | C | H | N | Cl |
|---|---|---|---|---|
| Calculated for $C_7H_4N_3OCl_9$ | 17.04 | 0.82 | 14.20 | 64.69 |
| Found | 17.67 | 1.29 | 14.48 | 63.49 |
|  | 17.63 | 1.22 | 14.36 | 63.52 |

(B) A mixture of 7.0 grams of the 2,4-bis-(trichloromethyl) - 6 - hydroxy - 1,3,5 - triazine - trichloroacetamidine salt of part A of this example, 13.1 grams of triethylamine, 4 grams of 2 percent palladium on carbon and 80 milliliters of methanol was shaken at room temperature with hydrogen. After the absorption of hydrogen was complete, the catalyst was filtered off by suction and a solution of sodium hydroxide was added, to the filtrate, in sufficient amount to convert the triethylamine hydrochloride into triethylamine and sodium chloride. After filtering off the precipitated NaCl, the filtrate was evaporated to dryness at reduced pressure. The residue was taken up with alcohol and the dimethylhydroxytriazine-acetamidine salt was precipitated with ether. The yield was 1.5 grams or 58 percent of the theory of the salt which, after vacuum sublimation, had a melting point of 212–213° C.

|  | C | H | N |
|---|---|---|---|
| Calculated for $C_7H_{13}N_5O$ | 45.88 | 7.15 | 38.23 |
| Found | 45.83 | 7.06 | 38.06 |
|  | 45.94 | 7.00 | 38.30 |

(C) Hydrogen chloride was passed into a solution of 2.5 grams of the dimethyl-hydroxytriazine-acetamidine salt (obtained by the method of the preceding paragraph), in 15 milliliters of ethanol, for 15 minutes. The precipitated 2,4-dimethyl-6-hydroxy-1,3,5-triazine-hydrochloride monohydrate was filtered off by suction and washed with 10 milliliters of cold ethanol to remove traces of acetamidine hydrochloride. The yield was 1.7 grams or 70 percent of the theory of product which melted at 177–179° C.

|  | C | H | N | Cl |
|---|---|---|---|---|
| Calculated for $C_5H_7N_3O \cdot HCl \cdot H_2O$ | 33.43 | 5.61 | 23.40 | 19.74 |
| Found | 34.21 | 5.41 | 23.79 | 19.71 |

(D) A solution comprising 1.17 grams of the 2,4-dimethyl - 6 - hydroxy - 1,3,5 - triazine - hydrochloride monohydrate in 15 milliliters of methanol was treated with 2.6 milliliters of a 10 percent solution of sodium hydroxide. The methanol was then evaporated in vacuo and the residue was sublimed at 150° C. and 0.05 mm. Hg. The sublimate was recrystallized from acetone and the yield was 490 milligrams or 60 percent of the theory of 2,4-dimethyl-6-hydroxy-1,3,5-triazine which melted at 230–231° C.

|  | C | H | N |
|---|---|---|---|
| Calculated for $C_5H_7N_3O$ | 47.99 | 5.64 | 33.57 |
| Found | 47.95 | 5.73 | 33.52 |

*Example II*

(A) The reaction involving 24.6 grams of dichloroacetamidine-hydrochloride and 12 grams of $COCl_2$ was carried out essentially as described in Example I(A). The desired condensation product was obtained as a viscous resin, separated by decantation, and dried in vacuo. The pulverized 2,4-bis(dichloromethyl)-6-hydroxy-1,3,5-triazine-dichloroacetamidine salt was recrystallized from benzene. The yield was 8 grams or 40 percent of the theory of the salt having a melting point of 241–245° C.

|  | C | H | N | Cl |
|---|---|---|---|---|
| Calculated for $C_7H_7N_5OCl_6$ | 21.56 | 1.81 | 17.96 | 54.56 |
| Found | 21.70 | 2.04 | 17.63 | 54.04 |
|  | 21.81 | 2.12 | 17.45 | 53.91 |

(B) A mixture of 4.0 grams of 2,4-bis(dichloromethyl) - 6 - hydroxy - 1,3,5 - triazine - dichloroacetamidine salt, 6.15 grams of triethylamine, 4 grams of 2 percent palladium on carbon and 80 milliliters of methanol was hydrogenated by the procedure of Example I(B) to obtain 2,4-dimethyl-6-hydroxy-triazine-acetamidine salt. The yield was 1.2 gram or 63 percent of the theory of the salt having a melting point of 212–213° C.

*Example III*

(A) The phosgenation of 52 grams of monochloroacetamidine hydrochloride was carried out by the procedure of Example I(A). Because of the solubility of the reaction product in water it was necessary to cool the reaction solution to −3° C. in order to separate all the monohydroxytriazine salt from the solution. The 2,4 - bis(monochloromethyl) - 6 - hydroxy - 1,3,5 - triazine-monochloroacetamidine salt was recrystallized from ethanol. The yield was 20 grams or 62.5 percent of the theory of this salt having a melting point of 150° C.

|  | C | H | N | Cl |
|---|---|---|---|---|
| Calculated for $C_7H_{10}N_5OCl_3$ | 29.34 | 3.51 | 24.44 | 37.12 |
| Found | 29.35 | 3.54 | 24.06 | 36.89 |
|  | 29.13 | 3.38 | 23.91 | 36.82 |

(B) A mixture of 4.0 grams of 2,4-bis-(monochloromethyl) - 6 - hydroxy - 1,3,5 - triazine - monochloroacetamidine salt, 4.3 grams of triethylamine and 4 grams of 2 percent palladium on carbon and 150 milliliters of methanol was shaken at room temperature with hydrogen. The absorption of 3.0 molar equivalents of hydrogen was completed in 40 minutes. The catalyst was filtered off by suction and a solution of 1.65 grams of sodium hydroxide in 15 milliliters of methanol was added to the filtrate in order to convert the triethylamine hydrochloride into triethylamine and sodium chloride. After having filtered off the precipitated NaCl, the filtrate was evaporated to dryness at reduced pressure. The residue was taken up with alcohol and precipitated again with ether. The yield was 2.6 grams, or 87.5 percent of the theory, of dimethyl-hydroxytriazine-acetamidine salt having a melting point of 195–200° C. The salt was purified by sublimation at 160° C. and 0.1 mm. Hg. Its new melting point was 212–213° C., which shows it to be the same compound as was produced in Examples I(B) and II(B).

We claim:

1. 2,4 - bis(substituted) - 6 - hydroxy - 1,3,5 - triazine amidine salt of the formula:

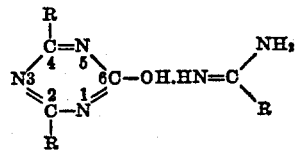

in which R is selected from the group consisting of alkyl and haloalkyl radicals containing not more than 12 carbon atoms.

2. The triazine amidine salt of claim 1 in which R is a chloroalkyl radical containing not more than 12 carbon atoms.

3. 2,4 - bis(trichloromethyl) - 6 - hydroxy - 1,3,5 - triazine-trichloroacetamidine salt.

4. 2,4 - bis(dichloromethyl) - 6 - hydroxy - 1,3,5 - triazine-dichloroacetamidine salt.

5. 2,4 - bis(monochloromethyl) - 6 - hydroxy - 1,3,5-triazine-monochloroacetamidine salt.

6. The triazine amidine salt of claim 1 in which R is an alkyl radical containing not more than 12 carbon atoms.

7. 2,4 - dimethyl - 6 - hydroxy - 1,3,5 - triazine-acetamidine salt.

8. The process of preparing 2,4-bis(substituted)-6-hydroxy-1,3,5-triazine amidine salts of the formula

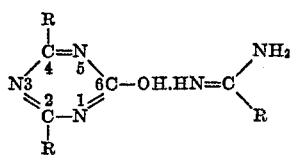

in which R is selected from the group consisting of alkyl and haloalkyl radicals, which comprises reacting an amidine of the formula

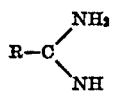

wherein R is a haloalkyl group containing not more than 12 carbon atoms having the halogen on the carbon atom adjacent to the amidine group, with phosgene at a temperature and in proportions and for a time effective to form a 2,4 - bis(haloalkyl) - 6 - hydroxy - 1,3,5 - triazine haloalkylamidine salt with hydrogen and reducing the haloalkylamidine salt in the presence of a hydrogenation catalyst to a 2,4 - bis(alkyl) - 6 - hydroxy - 1,3,5 - triazine alkylamidine salt.

9. The process of preparing 2,4 - bis(haloalkyl) - 6 - hydroxy - 1,3,5 - triazine amidine salts of the formula

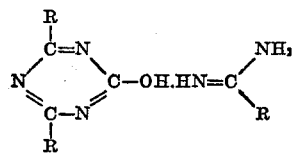

in which R is a haloalkyl radical, which comprises reacting a haloalkyl amidine of the formula

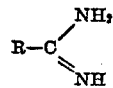

wherein R is a haloalkyl group containing not more than 12 carbons having the halogen on the carbon atom adjacent to the amidine group, with phosgene at a temperature and in proportions and for a time effective to form the triazine amidine salts.

10. The process of claim 9 in which the haloalkyl amidine is the hydrochloride salt and the mixture of the amidine salt and phosgene is reacted with an alkali to form the free triazine amidine.

11. The process of claim 9 in which the phosgene is in an inert organic solvent.

12. The process of preparing 2,4 - bis(trichloromethyl) - 6 - hydroxy - 1,3,5 - triazine - trichloroacetamidine salt which comprises reacting trichloroacetamidine with phosgene at a temperature and in proportions and for a time effective to form the amidine salt.

13. The process of preparing 2,4 - bis(dichloromethyl)-6 - hydroxy - 1,3,5 - triazine - dichloroacetamidine salt which comprises reacting dichloroacetamidine with phosgene at a temperature and in proportions and for a time effective to form the amidine salt.

14. The process of preparing 2,4 - bis(monochloromethyl) - 6 - hydroxy - 1,3,5 - triazine - monochloroacetamidine salt which comprises reacting monochloroacetamidine with phosgene at a temperature and in proportions and for a time effective to form the amidine salt.

15. The process of preparing 2,4 - bis(alkyl) - 6 - hydroxy - 1,3,5 - triazine amidine salt of the formula:

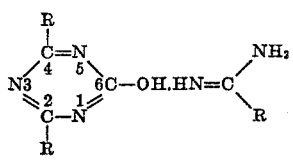

in which R is an alkyl radical, which comprises reducing with hydrogen in the presence of a hydrogenation catalyst 2,4 - bis(haloalkyl) - 6 - hydroxy - 1,3,5 - triazine haloalkylamidine salt in which the haloalkyl groups contain not more than 12 carbon atoms.

16. The process of claim 15 in which the catalyst is palladium on carbon.

17. The process of claim 15 in which the catalyst is Raney nickel.

18. The process of preparing 2,4 - dimethyl - 6 - hydroxy - 1,3,5 - triazine acetamidine salt which comprises reducing with hydrogen in the presence of a hydrogenation catalyst 2,4 - bis(chloromethyl) - 6 - hydroxy - 1,3,5-triazine chloromethylamidine salt in which the chloromethyl substituent is selected from the group consisting of trichloromethyl, dichloromethyl and monochloromethyl substituents.

19. the process of claim 18 in which the catalyst is palladium on carbon.

20. The process of claim 8 in which the haloalkyl amidine is the hydrochloride salt and the mixture of the amidine salt and phosgene is reacted with an alkali to form the free triazine amidine.

References Cited in the file of this patent

UNITED STATES PATENTS 2,714,057     Chenicek _____ July 26, 1955

OTHER REFERENCES

Berichte, 23, pages 2919–22 (1890).
Chemical Reviews, December 1944, pages 352, 407, 408.
Chemical Reviews, vol. 35, page 406 (1944).
Beilsteins Handbuch der Organischen Chemie, 4th ed. (1937), vol. 26, page 154, system No. 3873.
Broche: Journal für Praktische Chemie, vol. (2) 50, page 115 (1894).